US010784529B2

(12) United States Patent
Choi et al.

(10) Patent No.: US 10,784,529 B2
(45) Date of Patent: Sep. 22, 2020

(54) FRAME FOR FUEL CELL AND FUEL CELL STACK STRUCTURE HAVING THE FRAME

(71) Applicant: MICO CO., LTD., Anseong-si, Gyeonggi-do (KR)

(72) Inventors: Jong-Woo Choi, Anseong-si (KR); Song Ho Choi, Anseong-si (KR); Jin Ah Park, Anseong-si (KR)

(73) Assignee: MICO CO., LTD., Gyeonggi-Do (KR)

( * ) Notice: Subject to any disclaimer, the term of this patent is extended or adjusted under 35 U.S.C. 154(b) by 126 days.

(21) Appl. No.: 15/740,453

(22) PCT Filed: Mar. 31, 2016

(86) PCT No.: PCT/KR2016/003297
§ 371 (c)(1),
(2) Date: Dec. 28, 2017

(87) PCT Pub. No.: WO2017/003067
PCT Pub. Date: Jan. 5, 2017

(65) Prior Publication Data
US 2018/0191018 A1 Jul. 5, 2018

(30) Foreign Application Priority Data
Jun. 30, 2015 (KR) .......................... 10-2015-0093263

(51) Int. Cl.
H01M 8/247 (2016.01)
H01M 8/00 (2016.01)
(Continued)

(52) U.S. Cl.
CPC ........... H01M 8/247 (2013.01); H01M 8/006 (2013.01); H01M 8/0273 (2013.01);
(Continued)

(58) Field of Classification Search
CPC ................................ H01M 8/24; H01M 8/247
See application file for complete search history.

(56) References Cited

U.S. PATENT DOCUMENTS

2015/0180075 A1* 6/2015 Choi ................... H01M 8/0202
429/463

FOREIGN PATENT DOCUMENTS

JP 2010027422 2/2010
KR 101162668 7/2012
(Continued)

OTHER PUBLICATIONS

International Search Report and Written Opinion issued in International Application No. PCT/KR2016/003297, dated May 23, 2016.

Primary Examiner — Karie O'Neill Apicella
(74) Attorney, Agent, or Firm — Norton Rose Fulbright US LLP

(57) ABSTRACT

There is provided a frame for a fuel cell. The frame include a frame body having a channel opening defined therein and a feed opening and a discharge opening defined therein, wherein the feed opening and discharge opening are spaced apart from each other with the channel opening being disposed therebetween; and a plurality of anti-deformation support structures protruding from a top face of the frame body, in a first region between the channel opening and the feed opening and in a second region between the channel opening and the discharge opening, wherein each of the plurality of anti-deformation support structures has an elliptical cross-sectional shape having a major axis and a minor axis.

10 Claims, 7 Drawing Sheets

(51) Int. Cl.
*H01M 8/2457* (2016.01)
*H01M 8/2483* (2016.01)
*H01M 8/0273* (2016.01)
*H01M 8/2432* (2016.01)
H01M 8/0247 (2016.01)
H01M 8/124 (2016.01)

(52) U.S. Cl.
CPC ....... *H01M 8/2432* (2016.02); *H01M 8/2457* (2016.02); *H01M 8/2483* (2016.02); *H01M 8/0247* (2013.01); *H01M 2008/1293* (2013.01)

(56) References Cited

FOREIGN PATENT DOCUMENTS

| | | |
|---|---|---|
| KR | 1020130137784 | 12/2013 |
| KR | 1020140087188 | 7/2014 |
| KR | 1020150050449 | 5/2015 |

\* cited by examiner

[FIG. 1A]
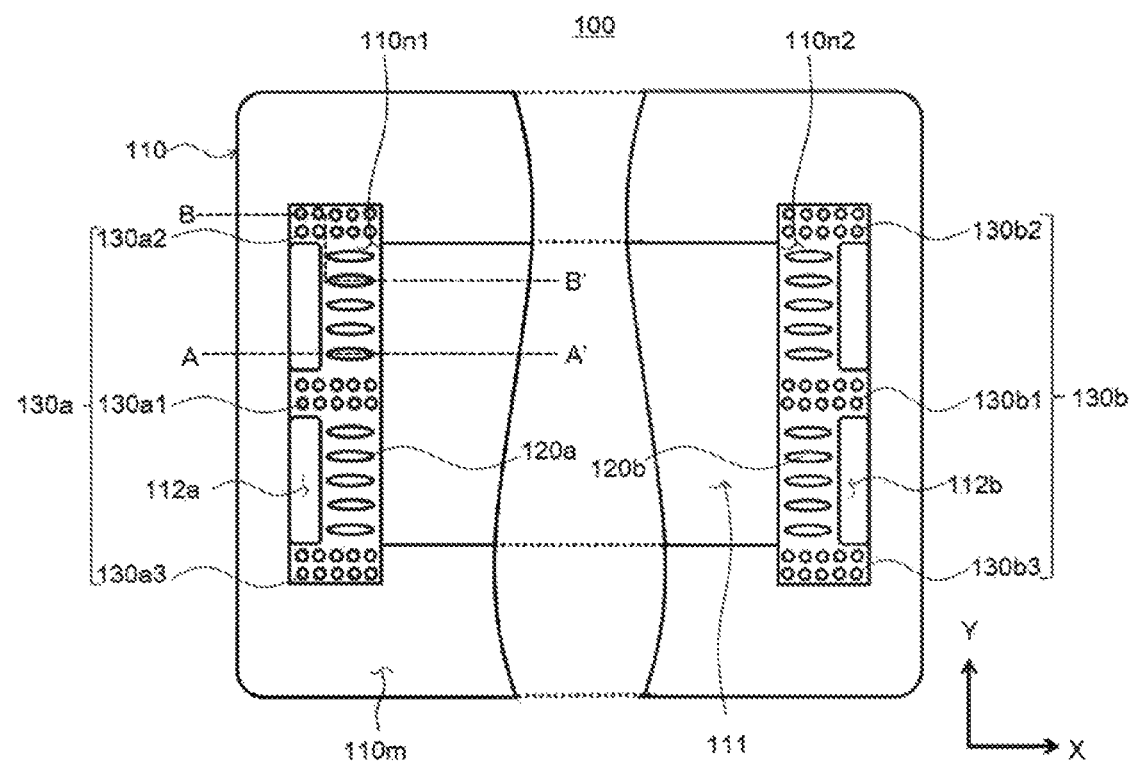

[FIG. 1B]
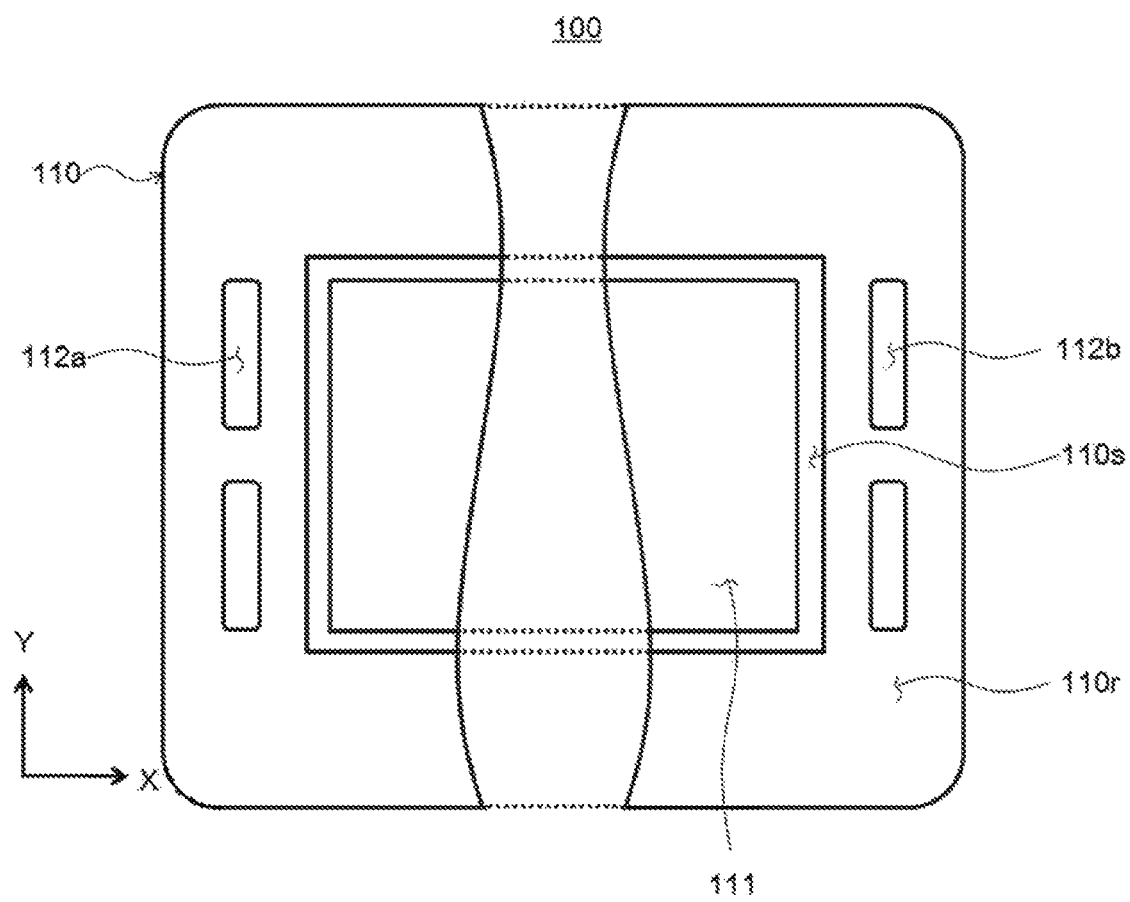

[FIG. 2A]
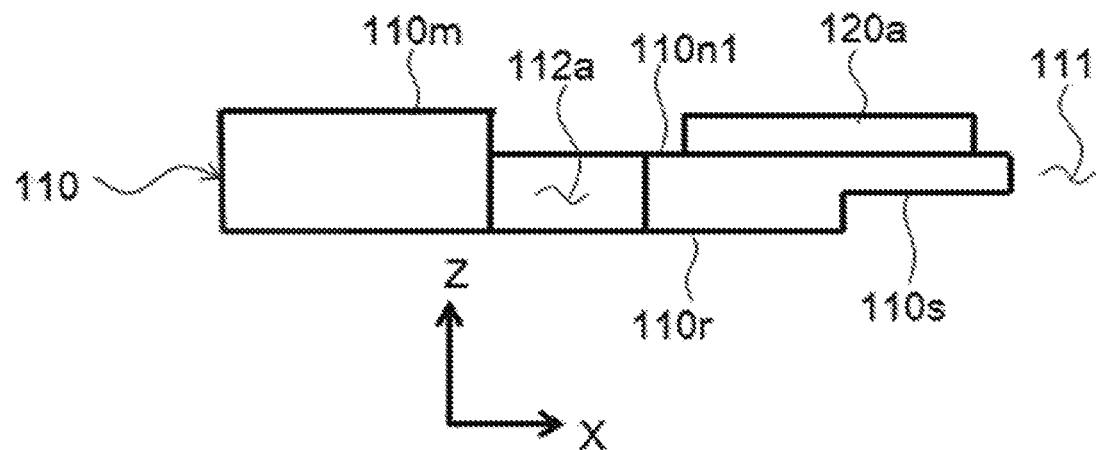
[FIG. 2B]
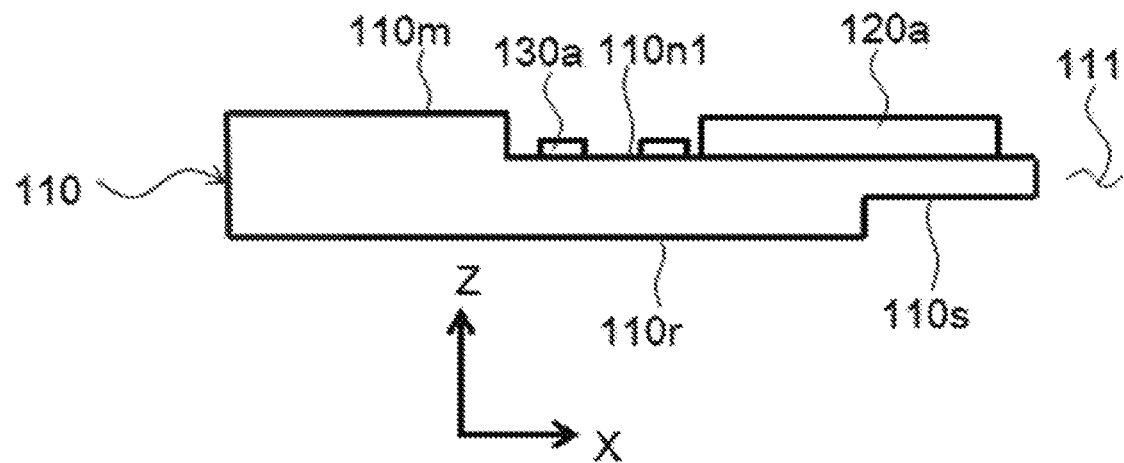

[FIG. 3]
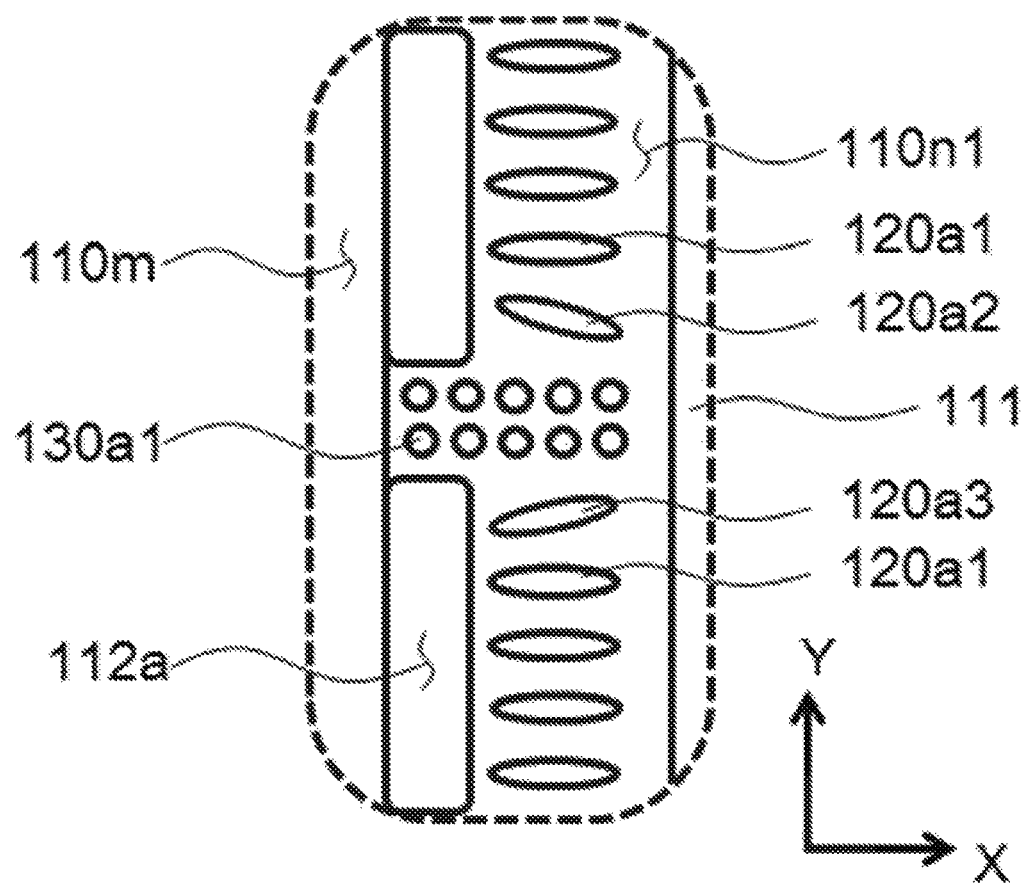
[FIG. 4]
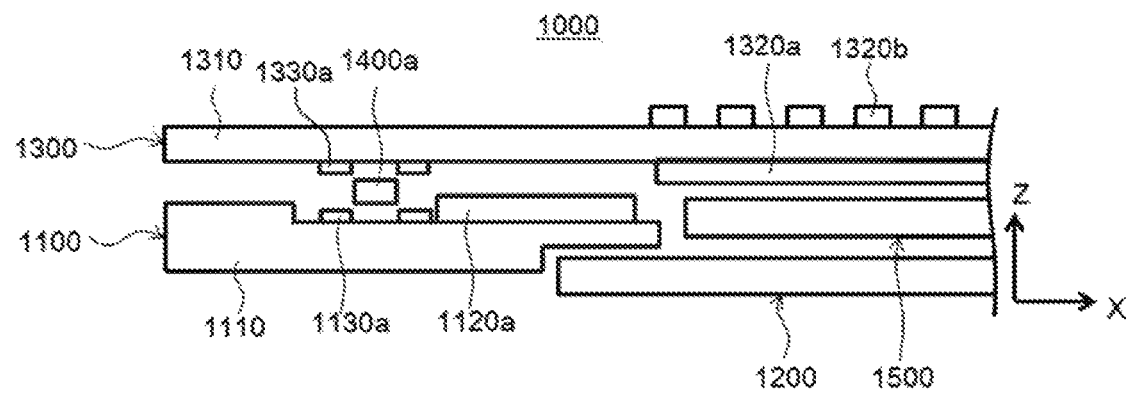

[FIG. 5]
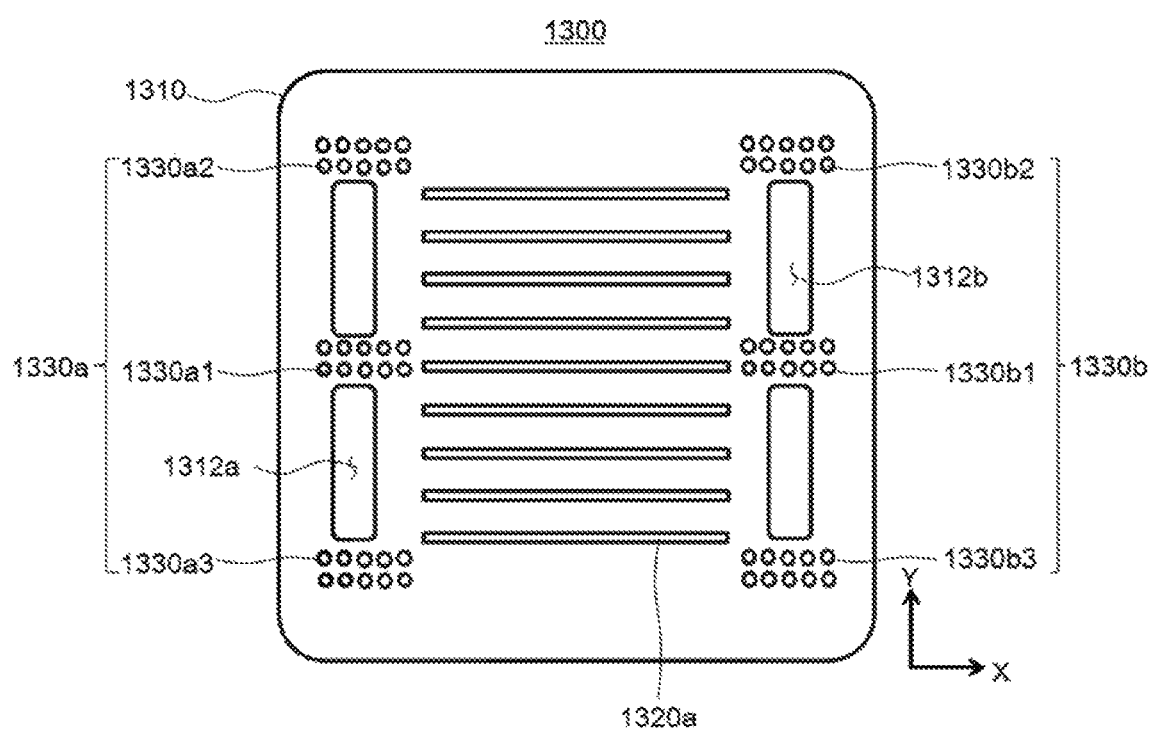

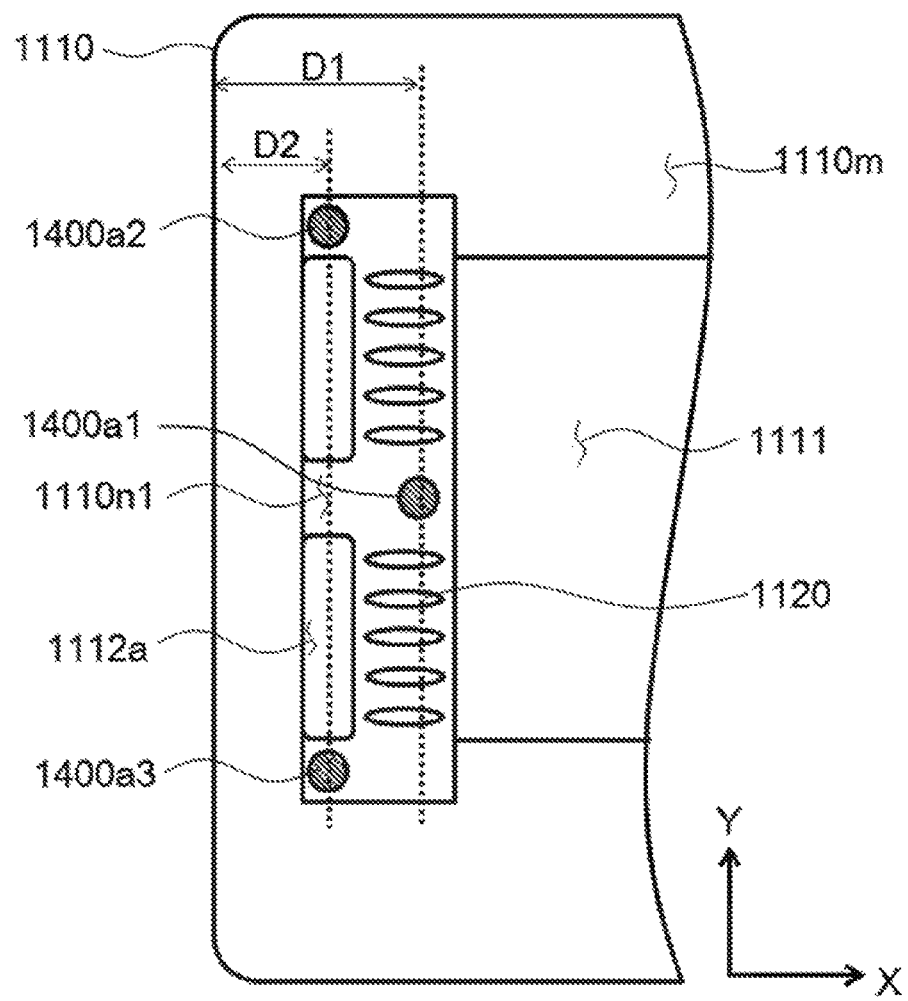
[FIG. 6]

[FIG. 7A]
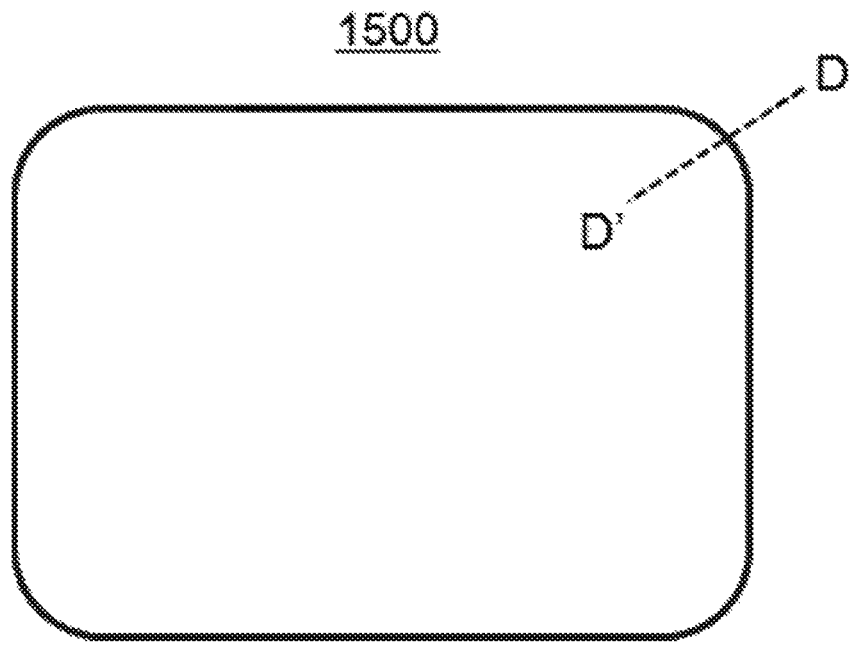
[FIG. 7B]
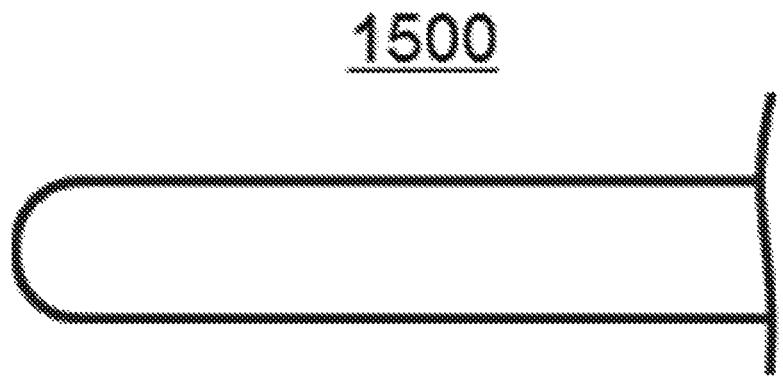

FRAME FOR FUEL CELL AND FUEL CELL STACK STRUCTURE HAVING THE FRAME

CROSS-REFERENCE TO RELATED APPLICATION

This application claims the benefit of Korean patent application No. 10-2015-0093263 filed on Jun. 30, 2015, the entire content of which is incorporated herein by reference for all purposes as if fully set forth herein.

BACKGROUND

Field of the Present Disclosure

The present disclosure relates to a frame for a fuel cell, and a fuel cell stack structure comprising the same, and more particularly, to a frame for a fuel cell capable of improving the durability of a fuel cell stack structure and a fuel cell stack structure including the same.

Discussion of Related Art

Generally, a fuel cell has a cathode layer and an anode layer on each side of an electrolyte layer. By flowing air containing oxygen and fuel gas containing hydrogen onto the cathode layer and the anode layer respectively, hydrogen and oxygen electrochemically reacts with each other in the electrolyte layer via the ion conduction phenomenon to generate electricity.

In such a fuel cell, the energy conversion is simple, and it has highly efficient and pollution-free environment-friendly properties in producing energy by oxidizing hydrogen in principle. As a result, studies on fuel cells have been actively conducted recently.

Particularly, a solid oxide fuel cell (SOFC) among the fuel cells is operated at a high temperature of about 600 to 1000° C. by using ceramics as an electrolyte. The solid oxide fuel cell SOFC among the fuel cells has the following advantages compared to molten carbonate fuel cell (MCFC), phosphoric acid fuel cell (PAFC), and a polymer fuel cell (PEFC): the solid oxide fuel cell (SOFC) is the most efficient and less polluting, and is capable of combined power generation without the need for a fuel reformer.

In such a fuel cell, in order to generally achieve high output, single cells, each consisting of an electrolyte layer, a cathode layer and an anode layer, are stacked together to form a fuel cell stack. The fuel cell stack is made up of a plurality of fuel cells stacked using members such as a frame, interconnectors and the like. During assembly or operation of the fuel cell stack, high pressure is applied to the fuel cell stack for stable electrical connection between single cells or for sealing of the fuel or air. As a result, the components of the fuel cell stack, such as the fuel cells, frame, and interconnectors, are likely to be deformed by the high pressure applied thereto. The deformation may reduce not only the stability of the fuel cell stack but also the power efficiency and the life of the fuel cell stack.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The purpose of the present disclosure is to provide a fuel cell frame that can improve the durability and stability of the fuel cell stack structure.

Another object of the present disclosure is to provide a fuel cell stack structure having improved durability and stability including the fuel cell frame.

In a first aspect of the present disclosure, there is provided a frame for a fuel cell, the frame comprising: a frame body having a channel opening defined therein and a feed opening and a discharge opening defined therein, wherein the feed opening and discharge opening are spaced apart from each other with the channel opening being disposed therebetween; and a plurality of anti-deformation support structures protruding from a top face of the frame body, in a first region between the channel opening and the feed opening and in a second region between the channel opening and the discharge opening, wherein each of the plurality of anti-deformation support structures has an elliptical cross-sectional shape having a major axis and a minor axis.

In one embodiment of the first aspect, each major axis of the anti-deformation support structures is parallel to a first direction from the feed opening to the discharge opening, wherein the anti-deformation support structures formed on the first region are arranged in a line along a second direction perpendicular to the first direction, wherein the anti-deformation support structures formed on the second region are arranged in a line along the second direction perpendicular to the first direction.

In one embodiment of the first aspect, the top face of the frame body includes an upper reference region, and a lower fluid-flow region, wherein the lower fluid-flow region has a lower level than the upper reference region and includes the first region and the second region.

In one embodiment of the first aspect, a vertical height of each of the anti-deformation support structures is between 80% and 120% of a difference between levels of the upper reference region and the lower fluid-flow region.

In one embodiment of the first aspect, a bottom face of the frame body includes a lower reference region and an upper cell-supporting region, wherein the upper cell-supporting region is formed along an edge of the channel opening and has a higher level than the lower reference region, wherein each of the anti-deformation support structures extends from the lower reference region to the upper cell-supporting region.

In one embodiment of the first aspect, the frame further comprises guide protrusions protruding on the lower fluid-flow region and arranged regularly in a lattice form.

In one embodiment of the first aspect, the feed opening comprises first and second feed holes spaced apart from each other, wherein the first region comprises: a third region positioned between the first feed hole and the channel opening, a fourth region positioned between the second feed hole and the channel opening, and a fifth region positioned between the third region and the fourth region and corresponding to a region between the first feed hole and the second feed hole, wherein the anti-deformation support structures formed on the first region are formed on the third region and on the fourth region, wherein a least some of the guide protrusions are formed on the fifth region.

In one embodiment of the first aspect, at least one of the anti-deformation support structures formed on the third region has a major axis inclined toward the fifth region, wherein said at least one is disposed adjacent to the fifth region, wherein each of remaining anti-deformation support structures of the anti-deformation support structures formed on the third region has a major axis parallel to a first direction from the feed opening to the discharge opening, wherein at least one of the anti-deformation support structures formed on the fourth region has a major axis inclined toward the fifth region, wherein said at least one is disposed adjacent to the fifth region, wherein each of remaining anti-deformation support structures of the anti-deformation support structures formed on the fourth region has a major axis parallel to the first direction.

In a second aspect of the present disclosure, there is provided a fuel cell stack structure comprising: a fuel cell including an upper electrode layer, a lower electrode layer and an electrolyte layer disposed between the upper electrode layer and lower electrode layer; a frame disposed on a top face of the fuel cell; and an interconnector disposed a top face of the frame, wherein the frame includes: a frame body having a channel opening defined therein and a feed opening and a discharge opening defined therein, wherein the feed opening and discharge opening are spaced apart from each other with the channel opening being disposed therebetween; and a plurality of anti-deformation support structures protruding from a top face of the frame body, in a first region between the channel opening and the feed opening and in a second region between the channel opening and the discharge opening, wherein each of the plurality of anti-deformation support structures has an elliptical cross-sectional shape having a major axis and a minor axis.

In one embodiment of the second aspect, the fuel cell stack structure further comprises a multi-functional structure disposed between the frame body and a portion of the interconnector corresponding to the frame body, wherein the top face of the frame body includes an upper reference region, and a lower fluid-flow region, wherein the lower fluid-flow region has a lower level than the upper reference region and includes the first region and the second region, wherein the multi-functional structure is disposed between the lower fluid-flow region and a portion of the interconnector corresponding to the lower fluid-flow region, wherein the frame further comprises a plurality of guide protrusions formed thereon, wherein the plurality of guide protrusions protrude from the lower fluid-flow region toward the interconnector to support side faces of the multi-functional structure.

In one embodiment of the second aspect, a vertical height of each of the guide protrusions is smaller than or equal to a vertical height of each of the anti-deformation support structures, wherein a vertical height of the multi-functional structure is substantially equal to the vertical height of each of the anti-deformation support structures.

In one embodiment of the second aspect, the fuel cell stack structure further comprises a current collector inserted into the channel opening, wherein the current collector electrically connects the interconnector to the upper electrode layer of the fuel cell, and the current collector has a rectangular plate structure with rounded corners, wherein a lateral edge of each of the corners of the current collector is rounded.

According to the above-mentioned present disclosure, by forming the anti-deformation support structures on the lower fluid-flow region of the frame, not only a uniform flow of fuel or air may be induced, but also deformation of the interconnector due to the height difference between the lower fluid-flow region and the upper reference region may be prevented. Further, the deformation of the frame itself, which may be otherwise caused by the difference between the thicknesses of the lower reference region and the cell supporting region, may be prevented.

Further, depending on the positions of the multi-functional structures, the loads applied to the different regions in the fuel cell in the fuel cell stack structure may be varied. According to the present disclosure, by forming the guide protrusions for supporting the multi-functional structure on the frame as described above, and by placing the central structure of the multi-functional structure relatively close to the fuel cell and placing the corner structures relatively far from the fuel cell, it is possible to reduce the deviation between the loads applied to the regions of the fuel cell while stably supporting the multi-functional structures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1A is a plan view for illustrating a frame for a fuel cell according to an embodiment of the present disclosure.

FIG. 1B is a rear view of the frame for a fuel cell as shown in FIG. 1A.

FIG. 2A is a cross-sectional view taken along a cutting line A-A' shown in FIG. 1A.

FIG. 2B is a cross-sectional view taken along a cutting line B-B' shown in FIG. 1A.

FIG. 3 is a partial top view illustrating one embodiment of anti-deformation support structures.

FIG. 4 is a partial cross-sectional view illustrating a fuel cell stack structure according to an embodiment of the present disclosure.

FIG. 5 is a top view for illustrating an interconnector shown in FIG. 4.

FIG. 6 is a top view illustrating positions of multi-functional structures.

FIG. 7A is a top view of a current collector shown in FIG. 4.

FIG. 7B is a cross-sectional view taken along a cutting line D-D' shown in FIG. 7A.

DETAILED DESCRIPTIONS

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

FIG. 1A is a plan view for illustrating a frame for a fuel cell according to an embodiment of the present disclosure. FIG. 1B is a rear view of the frame for a fuel cell as shown in FIG. 1A. FIG. 2A is a cross-sectional view taken along a cutting line A-A' shown in FIG. 1A. FIG. 2B is a cross-sectional view taken along a cutting line B-B' shown in FIG. 1A.

A frame for a fuel cell 100 according to an embodiment of the present disclosure may be configured to support an edge of a planar fuel cell (see '1200' in FIG. 4) in a fuel cell stack structure (see FIG. 4), thereby not only to improve the durability of the fuel cell stack structure but also to improve the assembled ability of the fuel cell stack structure.

Referring FIG. 1A, FIG. 1B, FIG. 2A and FIG. 2B, the frame for a fuel cell 100 according to an embodiment of the present disclosure may include a frame body 110 and a plurality of anti-deformation support structures 120.

The frame body 110 may have a rectangular frame structure having a channel opening 111 to expose an electrode of a fuel cell and defined in the center portion thereof. The channel opening 111 may be formed in a substantially rectangular shape. In the frame body 110, a feed opening 112a is formed between the channel opening 111 and the first edge of the frame body 110, and fuel or air is supplied to the feed opening 112a for the electrochemical reaction of the fuel cell supported thereon. A discharge opening 112b is formed between the channel opening 111 and the second edge of the frame body 110 opposite the first edge. The fuel or gas supplied through the feed opening 112a is discharged to the discharge opening 112b. Each of the feed opening 112a and the discharge opening 112b may extend in a first direction Y as an extension direction of the first and second edges of the frame body 110 as shown in FIG. 1A and FIG. 1B. Each of the feed opening 112a and the discharge opening 112b may be formed in a structure including two or more openings spaced from each other in the first direction Y. Alternatively, each of the feed opening 112a and the discharge opening 112b may be formed as a single opening structure extending along the first direction Y.

Further, as shown in FIG. 1A, FIG. 2A and FIG. 2B, the top face of the frame body 110 includes upper reference regions 110m, and lower fluid-flow regions 110n1 and 110n2, wherein the lower fluid-flow regions 110n1 and 110n2 have a lower height than the upper reference regions 110m. A step may be formed at the boundary between a corresponding upper reference region 110m and the corresponding lower fluid-flow region 110n1 or 110n2. Further, the lower fluid-flow regions may include a first lower fluid-flow region 110n1 formed to surround the feed opening 112a from the first edge of the channel opening 111 adjacent to the first edge of the frame body 110 so that fuel or air supplied to the feed opening 112a can be easily moved to the channel opening 111; and a second lower fluid-flow region 110n2 formed to surround the discharge opening 112b from the second edge of the channel opening 111 adjacent to the second edge of the frame body 110 such that the supplied fuel or air can be easily moved from the channel opening 111 to the discharge opening 112b. The first lower fluid-flow region 110n1 and the second lower fluid-flow region 110n2 may be spaced apart from each other with the channel opening 111 being disposed therebetween, and may have a symmetrical structure with respect to the channel opening 111. Accordingly, the first lower fluid-flow region 110n1 will be mainly described below, and the second lower fluid-flow region 110n2 will not be described.

As shown in FIG. 1A, the first lower fluid-flow region 110n1 may have a rectangular shape elongated along the first edge of the channel opening 111. The length of the first lower fluid-flow region 110n1 according to the first direction Y may be equal to or greater than the length of the first edge of the channel opening 111, that is, the width of the channel opening 111 along the first direction Y. The width of the first lower fluid-flow region 110n1 along the second direction X perpendicular to the first direction Y may be greater than or equal to the shortest distance the first edge of the channel opening 111 to the distal end of the feed opening 112a.

In one embodiment, as shown in FIG. 1A, the length of the first lower fluid-flow region 110n1 may be greater than the width of the channel opening 111 along the first direction Y, and the width of the first lower fluid-flow region 110n1 may be equal to the shortest distance from the first edge of the channel opening 111 to the distal end of the feed opening 112a.

As shown in FIG. 1B, FIG. 2A and FIG. 2B, a bottom face of the frame body 110 may include a lower reference region 110r, and an upper cell-supporting region 110s higher than the lower reference region 110r. A step may be formed at the boundary between the lower reference region 110r and the upper cell-supporting region 110s. The upper cell-supporting region 110s may be formed to have a constant width along an edge of the channel opening 111 so as to surround the channel opening 111. The width of the upper cell-supporting region 110s may be smaller than the shortest distance from the channel opening 111 to the feed opening 112a. As a result, the width of the upper cell-supporting region 110s may be smaller than the width of the first lower fluid-flow region 110n1 according to the second direction X.

The plurality of anti-deformation support structures 120a and 120b may be formed on the lower fluid-flow regions 110n1 and 110n2 of the top face of the frame body 110. Specifically, the plurality of anti-deformation support structures 120a and 120b include first anti-deformation support structures 120a formed on the first lower fluid-flow region 110n1 and second anti-deformation support structures 120b formed on the second lower fluid-flow region 110n2. The second anti-deformation support structures 120b formed on the second lower fluid-flow region 110n2 are substantially symmetrical with the first anti-deformation support structures 120a formed on the first lower fluid-flow region 110n1 with respect to the channel opening 111. Therefore, in the following, the first anti-deformation support structures 120a will be mainly described. Descriptions of the second anti-deformation support structures 120b will be omitted.

The first anti-deformation support structures 120a may disposed between the feed opening 112a and the channel opening 111, and may be arranged in a line along the first direction Y.

The first anti-deformation support structures 120a may protrude upward on the first lower fluid-flow region 110n1 of the top face of the frame body 110. In this case, the height of each of the first anti-deformation support structures 120a on the first lower fluid-flow region 110n1 may be similar to the height difference between the first lower fluid-flow region 110n1 and the upper reference region 110m.

In one embodiment, the height of each of the first anti-deformation support structures 120a may be about 80% or more and 120% or less of the height difference between the first lower fluid-flow region 110n1 and the upper reference region 110m. Within the fuel cell stack structure (see '1000' in FIG. 4), the anti-deformation support structures 120a and 120b support an interconnector (see '1300' in FIG. 4) positioned adjacent to an external load, thereby, to prevent deformation of the interconnector and other components that may otherwise occur due to the height difference between the lower fluid-flow regions 110n1, 110n2 and the upper reference region 110m. Thus, if the height of each of the anti-deformation support structures 120a, 120b is less than 80% of the height difference between the lower fluid-flow regions 110n1, 110n2 and the upper reference region 110m, this cannot perform the deformation preventing function for the interconnector and other components. In contrast, when the height of each of the anti-deformation support structures 120a, 120b exceeds 120% of the height difference between the lower fluid-flow regions 110n1, 110n2 and the upper reference region 110m, the frame body 110 or adjacent components may be deformed due to the height difference between the top face of the anti-deformation support structures 120a, 120b and the upper reference region 110m.

Further, each of the anti-deformation support structures 120a and 120b may extend from the lower reference region 110r of the bottom face of the frame body 110 to the upper cell-supporting region 110s thereof. As shown in FIG. 2A and FIG. 2B, there is a thickness difference between a portion of the frame body 110 corresponding to the upper cell-supporting region 110s and a portion thereof corresponding to the lower reference region 110r. Due to such a difference in thickness, when an external load is applied to the frame body 110, the frame body 110 may be warped at a boundary between the lower reference region 110r and the upper cell-supporting region 110s.

However, according to the present disclosure, by forming the anti-deformation support structures 120a and 120b so as to extend from the lower reference region 110r to the upper cell-supporting region 110s as described above, deformation of the frame body 110 otherwise occurring at the boundary between the lower reference region 110r and the upper cell-supporting region 110s can be effectively prevented.

Each of the first anti-deformation support structures 120a may have an elliptical cross section shape extending from the feed opening 112a to the channel opening 111 in an elongate manner. For example, as shown in FIG. 1A, each of the first anti-deformation support structures 120a may have an elliptical cross-section shape having a major axis parallel to the second direction X and a minor axis parallel to the first direction Y. When the first anti-deformation support structure 120a having the elliptical cross section shape having a major axis parallel to the second direction X is formed between the feed opening 112a and the channel opening 111, the fuel or air supplied to the feed opening 112a may be uniformly guided to the entire region of the channel opening 111.

Further, the frame for a fuel cell 100 according to an embodiment of the present disclosure may further include guide protrusions 130a and 130b formed on the lower fluid-flow regions 110n1 and 110n2 of the top face of the frame body 110.

Further, as shown in FIG. 4, a fuel cell stack structure 1000 according to an embodiment of the present disclosure includes a multi-functional structure 1400. The multi-functional structure 1400 may be disposed between the frame 1100 and the interconnector 1300 to distribute the load acting between the frame 1100 and the interconnector 1300, and to maintain the spacing between the interconnectors 1300, together with the anti-deformation support structures 1120a of the frame 1100. The guide protrusions 130a and 130b (see 1130a in FIG. 4) support side aces of the multi-functional structure (see '1400' in FIG. 4) to prevent the multi-functional structure from moving.

The height of each of the guide protrusions 130a and 130b may be less than or equal to the height of the anti-deformation support structures 120a and 120b with respect to the lower fluid-flow regions 110n1 and 110n2. Further, each of the guide protrusions 130a, 130b may have various cross-sectional shapes. In one example, each of the guide protrusions 130a, 130b may have a circular cross-sectional shape.

In one embodiment, as for first guide protrusions 130a formed on the first lower fluid-flow region 110n1, when the feed opening 112a includes two or more supply holes spaced from each other, the first guide protrusions 130a may include central protrusions 130a1. In this connection, the central protrusions 130a1 are formed in corresponding areas between adjacent supply holes so as not to interfere with the flow of fuel or air moving from the feed opening 112 to the channel opening 111.

The central protrusions 130a1 may be regularly arranged in a lattice pattern. For example, the central protrusions 130a1 may be configured by forming two or more protrusion arrays in which three or more protrusions are arranged in a line along the second direction X. The adjacent protrusion arrays may be spaced apart from the first direction Y by a predetermined distance. Specifically, as for the adjacent first and second protrusion arrays, two adjacent protrusions included in the first protrusion array and corresponding two adjacent protrusions included in the second protrusion array may be arranged to be placed at the corner positions of the square. In this case, as shown in FIG. 4, the multi-functional structure ('1400a' in FIG. 4) is inserted in a space defined by the four protrusions ('1330a' in FIG. 4) arranged in a square shape. The sides of the multi-functional structure may be supported by the four protrusions. Accordingly, when arranging the guide protrusions 130a and 130b according to the present disclosure, a plurality of spaces into which the multi-functional structure ('1400' in FIG. 4) may be inserted are formed, and, thus, the position of the multi-functional structure ('1400' in FIG. 4) may be changed. This will be described later.

Further, the first guide protrusions 130a as shown in FIG. 1A may include first edge protrusions 130a2 formed on the left region of the feed opening 112a, and second edge protrusions 130a3 formed on the right region thereof.

Each of the first and second edge protrusions 130a2 and 130a3 has the same structure and arrangement as those of the central protrusions 130a1, and, thus, redundant detailed description thereof will be omitted.

Further, the second guide protrusions 130b formed on the second lower fluid-flow region 110n2 are substantially symmetrical with the first guide protrusions 130a formed on the first lower fluid-flow region 110n1 with respect to the center line of the frame body 110 parallel to the first direction Y. Therefore, redundant detailed description of the second guide protrusions 130b will be omitted.

Hereinafter, referring to FIG. 1A and FIG. 3, the arrangement of the anti-deformation support structures will be described in detail.

Referring to FIG. 1A and FIG. 3, as for the first anti-deformation support structures 120a formed on the first lower fluid-flow region 110n1, when the feed openings 112a include first feed holes and second feed holes spaced apart from each other, the guide protrusions 130a1 may be formed in the first region between the first and second feed holes, while the first anti-deformation support structures 120a may be formed on the second region between the first feed hole and the channel opening 111, and on the third region between the second feed hole and the channel opening 111. That is, the first anti-deformation support structures 120a may be formed on the second region and the third region that are spaced apart from each other with the first region being disposed therebetween.

In one embodiment, as shown in FIG. 1A, each of the first anti-deformation support structures 120a formed on the second region has an elliptical cross section having a major axis parallel to the second direction X, as described above. The first anti-deformation support structures 120a formed on the second region may be arranged in a line along the first direction Y and may be spaced apart from each other by a predetermined distance. Further, each of the first anti-deformation support structures 120a formed in the third region has an elliptical cross section having a major axis parallel to the second direction X. The first anti-deformation support structures 120a formed in the third region may be arranged in a line along the first direction Y, and may be spaced apart from each other by a predetermined distance.

However, when the first anti-deformation support structures 120a are formed as described above, the first region in which the guide protrusions 130a1 are formed is positioned between the second region and the third region, and, thus, there is a possibility that supply of fuel or air to a portion corresponding to the first region of the channel opening 111 may be reduced. In order to solve this problem, the first anti-deformation support structures 120a may be formed as shown in FIG. 3.

In another embodiment, as shown in FIG. 3, among the anti-deformation support structures 120a1 and 120a2 formed on the second region, the anti-deformation support structure 120a2 disposed adjacent to the guide protrusions 130a1 formed on the first region is configured to have an elliptical cross section having a long axis inclined in the positive direction with respect to the second direction X to guide fuel or air to a portion of the channel opening 111 corresponding to the first region. Each of the remaining anti-deformation support structures 120a1 may be formed to have an elliptical cross section having a long axis parallel to the second direction X.

Further, among the anti-deformation support structures 120a1 and 120a3 formed on the third region, the anti-deformation support structure 120a3 disposed adjacent to the guide protrusions 130a1 formed on the first region is configured to have an elliptical cross section having a long axis inclined in the negative direction with respect to the second direction X to guide fuel or air to a portion of the channel opening 111 corresponding to the first region. Each of the remaining anti-deformation support structures 120a1 may be formed to have an elliptical cross section having a long axis parallel to the second direction X.

In this case, the anti-deformation support structures 120a1 and 120a2 formed on the second region and the anti-deformation support structures 120a and 120a3 formed on the third region may be formed to have a substantially symmetrical structure with respect to a centerline of the first region parallel to the second direction X. When the anti-deformation support structures 120a1, 120a2, and 120a3 are formed in this manner, fuel or air may be uniformly supplied to the entire region of the channel opening 111.

Further, the second anti-deformation support structures 120b formed on the second lower fluid-flow region 110n2 may be formed to be substantially symmetrical with the first anti-deformation support structures 120a formed on the first lower fluid-flow region 110n1, based on the center line of the frame body 110 parallel to the first direction Y. Therefore, redundant detailed description of the second anti-deformation support structures 120b will be omitted.

FIG. 4 is a partial cross-sectional view illustrating a fuel cell stack structure according to an embodiment of the present disclosure. FIG. 5 is a top view for illustrating an interconnector shown in FIG. 4. FIG. 6 is a top view illustrating positions of multi-functional structures. FIG. 7A is a top view of a current collector shown in FIG. 4. FIG. 7B is a cross-sectional view taken along a cutting line D-D' shown in FIG. 7A.

Referring to FIG. 4, FIG. 5, FIG. 6, FIG. 7A and FIG. 7B, the fuel cell stack structure 1000 according to an embodiment of the present disclosure may include a frame 1100, a fuel cell 1200, an interconnector 1300, a multi-functional structure 1400 and a current collector 1500.

The frame 1100 is substantially the same as the frame for the fuel cell 100 as described with reference to FIG. 1A, FIG. 1B, FIG. 2A, FIG. 2B and FIG. 3 and thus a detailed description thereof will be omitted.

The fuel cell 1200 may have a planar structure and may be disposed on the upper cell-supporting region of the frame 1100 (see '110s' in FIG. 1B). The fuel cell 1200 may include a first electrode layer and a second electrode layer, which are opposite to each other, and an electrolyte layer disposed between the electrode layers. In one embodiment, the fuel cell 1200 may be a solid oxide fuel cell in which the electrolyte layer is formed of solid oxide.

When the fuel cell 1200 is supported on the frame 1100, the edge portion of the electrolyte layer may be disposed on the upper cell-supporting region (refer to '110s' in FIG. 1A) of the frame 1100, and the first electrode layer may be exposed by the channel opening of the frame 1100 (see '111' in FIG. 1A).

The interconnector 1300 is disposed above the frame 1100 and the fuel cell 1200. The interconnector 1300 may be electrically connected to the first electrode layer of the fuel cell 1200 through the current collector 1500. Further, although not shown in the drawing, the interconnector 1300 may be electrically connected to a second electrode layer of another fuel cell (not shown) disposed above the interconnector 1300. As a result, the two fuel cells may be electrically connected to each other in series via the interconnector 1300.

The interconnector 1300 as shown in FIG. 5 may include the following components: an interconnector body 1310 having a plate structure with a second feed opening 1312a and a second discharge opening 1312b defined therein, first channel spacers 1320a and 1320b arranged in a region corresponding to the channel opening of the frame 1100 among the bottom face of the interconnector body 1310 facing the frame 1100, and interconnector guide protrusions 1330a and 1330b protruding from the bottom face of the interconnector body 1310 and facing guide protrusions 1130 of the frame 1300 (hereinafter referred to as 'frame guide protrusions' for convenience of description). The second feed opening 1312a and second discharge opening 1312b communicate with the feed openings of the frame 1100 (refer to '112a' in FIG. 1A, and hereinafter, referred to as 'first feed openings' for convenience of explanation) and the discharge openings (see 112b in FIG. 1A, and hereinafter referred to as 'first discharge openings' for the convenience of illustration) respectively. Further, the interconnector 1300 may further include second channel spacers 1320b disposed on a region corresponding to a channel opening (refer to '111' in FIG. 1) of the top face of the interconnector body 1310.

The interconnector body 1310 may be formed of a conductive material, for example, a metal material. The interconnector body 1310 may have a rectangular plate structure with an outer periphery of the same or similar shape and size as the frame 1100.

The first channel spacers 1320a may be formed to protrude from the bottom face of the interconnector body 1310 toward the frame 1100. The first channel spacers 1320a may be elongated in the second direction X. The first channel spacers 1320a may be spaced apart from each other by a predetermined distance in the first direction Y to defined channels therebetween through which fuel or air may flow. The second channel spacers 1320b may be formed to protrude from the top face of the interconnector body 1310. The second channel spacers 1320b may extend in a direction crossing the first channel spacers 1320a and may be spaced apart from each other by a predetermined distance. The first and second channel spacers 1320a and 1320b may be formed of the same material as the interconnector body 1310. For example, the first and second channel spacers 1320a and 1320b may be formed integrally with the interconnector body 1310.

The interconnector guide protrusions 1330a and 1330b may protrude from the bottom face of the interconnector body 1310. The interconnector guide protrusions 1330a and 1330b may be positioned to face the frame guide protrusions (see 130a and 130b in FIG. 1A) formed on the frame. The interconnector guide protrusions 1330a and 1330b may be formed on the bottom face of the interconnector body 1310 to have the same structure and arrangement as the frame guide protrusions (see 130a and 130b in FIG. 1A) formed on the frame. Thus, redundant detailed descriptions of the interconnector guide protrusions 1330a and 1330b are omitted.

The multi-functional structures 1400 are disposed between the frame 1100 and the interconnector 1300. The multi-functional structures 1400 together with the anti-deformation support structures (see '120a' and '120b' in FIG. 1A) of the frame 1100 may support loads applied to the frame 1100 and the interconnector 1300.

The multi-functional structures 1400 may comprise first multi-functional structures 1400a disposed between the first lower fluid-flow region (see '110n1' in FIG. 1A) of the top face of the frame body 110 and a portion of the interconnector body 1310 corresponding thereto, and second multi-functional structures (not shown) disposed between the second lower fluid-flow region (see '110n2' in FIG. 1A) of the top face of the frame body 110 and a portion of the interconnector body 1310 corresponding thereto.

The second multi-functional structures are disposed substantially symmetrical with the first multi-functional structures 1400a with reference to the centerline of the frame 1100 and the interconnector 1300 parallel to the first direction Y. The second multi-functional structures are substantially the same as the first multi-functional structures 1400a. Therefore, in the following, the first multi-functional structures 1400a will be mainly described, and the description of the second multi-functional structures will be omitted.

Each of the first multi-functional structures 1400a may have a columnar structure having various cross-sections. For example, each of the first multi-functional structures 1400a may have a cylindrical structure having a circular cross-sectional shape. In one embodiment, the height of each of the first multi-functional structures 1400a may be substantially the same as the height of each of the anti-deformation support structures 1120 of the frame 1100.

The lower end and the upper end of each of the first multi-functional structures 1400a may be supported by the first lower fluid-flow region (see '110n1' in FIG. 1A) of the top face of the frame body 1110 and a portion of the bottom face of the interconnection body 1310 corresponding thereto, respectively. In this case, the lower end of each of the first multi-functional structures 1400a is inserted into the space between the frame guide protrusions 1130a of the frame 1100. Side faces of the lower end of each of the first multi-functional structures 1400a may be supported by the frame guide protrusions 1130a. The upper end of each of the first multi-functional structures 1400a is inserted into a space between interconnector guide protrusions 1330a of the interconnector 1300. The side faces of the upper end of each of the first multi-functional structures 1400a may be supported by the interconnector guide protrusions 1330a.

In one embodiment, as shown in FIG. 6, the first multi-functional structures 1400a may include one or more central structures 1400a1, 1400a2 disposed on a central region between the adjacent feed holes 112a in the first lower fluid-flow region 1110n1 of the top face of the frame body 1110, a first corner structure 1400a2 disposed on the right edge region to the feed holes in the first lower fluid-flow region 1110n1, and a second corner structure 1400a3 disposed on the left edge region to the feed holes in the first lower fluid-flow region 1110n1.

In this case, in order to reduce a load variation applied to the fuel cell 1200 supported by the frame 1100, the distance D1 from the first edge of the frame body 1110 to the central structure 1400a1 may be greater than the distance D2 from the first edge of the frame body 1110 to the first and second corner structures 1400a2 and 1400a3.

Table 1 shows the results of measuring loads applied to fuel cell regions based on the location of multi-functional structures. In Table 1, the 'position of the multi-functional structure' indicates the relative distance in the X-axis direction of the multi-functional structures, as measured with respect to the reference line parallel to the first direction X of FIG. 6. For example, 'comparison example' refers to the case where the central structure and the first and second corner structures are placed in the reference line. 'Embodiment 1 to embodiment 3' are compared with the comparison example, and refer to the cases where the central structure is moved by a distance indicated in the table 1 in '+X' direction, and the first and second corner structures are moved by the distance indicated in the table 1 in '−X' direction.

With reference to Table 1 together with FIG. 6, in the comparison example, it may be seen that the difference between the load applied to both corner regions of the fuel cell and the load applied to the intermediate region between them is relatively large. To the contrary, in the embodiments 1 to 3, it may be seen that the difference between the load applied to both corner regions of the fuel cell and the load applied to the intermediate region between them greatly decreases.

Thus, by positioning the central structure relatively close to the fuel cell and positioning the corner structures relatively far from the fuel cell, the difference between the loads applied to the various regions of the fuel cell may be reduced.

TABLE 1

| | Load % | multi-functional structure position | | | Load applied to fuel cell region | | | |
|---|---|---|---|---|---|---|---|---|
| | | first corner structure | center structure | second corner structure | first corner region | middle region | second corner region | Pressure Difference |
| Comparison example | 80 | 0 | 0 | 0 | 37.4 | 25.1 | 37.4 | 12.3 |
| | 90 | 0 | 0 | 0 | 38.6 | 22.9 | 38.6 | 15.7 |
| | 100 | 0 | 0 | 0 | 39.7 | 20.6 | 39.7 | 19.1 |
| Embodiment 1 | 80 | −48 | +15 | −48 | 33.7 | 32.6 | 33.7 | 1.1 |
| Embodiment 2 | 90 | −48 | +17 | −48 | 33.7 | 32.6 | 33.7 | 1.1 |
| Embodiment 3 | 100 | −48 | +19 | −48 | 33.8 | 32.5 | 33.8 | 1.3 |

Although in the above description, the multi-functional structures 1400 are implemented as separate members separate from the interconnector 1300, the present disclosure is not limited thereto. In one embodiment, the multi-functional structures 1400 may be formed integrally with the interconnector 1300. In this case, the guide protrusions may not be formed on the interconnector 1300. When the multi-functional structures 1400 are formed integrally with the interconnector 1300 in this manner, ends of each of the multi-functional structures 1400 are supported by the guide protrusions 1130 of the frame 1100, and, thus, the interconnector 1300 may be prevented from sliding relative to the frame 1100 during the assembling process or the operation of the fuel cell stack structure.

The current collector 1500 is disposed between the fuel cell 1200 and the interconnector 1300 and thus electrically connects the fuel cell 1200 and the interconnector 1300. The current collector 1500 may be disposed inside the channel opening 1111 of the frame 1100 and may be formed of a conductive material, for example, a metal material.

Referring to FIG. 7A and FIG. 7B, the current collector 1500 may have a rectangular shape having a rounded corner portion and the rounded edge portion thereof. More specifically, each of the rounded corner portion and the rounded edge portion may have the rounded horizontal portion and the rounded vertical portion. The method of rounding the corner and edge portions of the current collector 1500 is not particularly limited. Since the current collector 1500 is generally formed of a metal material, there is a high possibility that other portions of the current collector 1500 are formed to be slightly protruded or recessed relative to the corner portion thereof. When such a current collector 1500 is used, a crack may be generated in the electrode layer of the fuel cell 1200 directly pressurized by the current collector 1500. In order to solve this problem, in accordance with the present disclosure, the rounded corner of the current collector 1500 has the rounded horizontal portion and the rounded vertical portion.

Although not shown in the drawings, as for the fuel cell 1200, the edge portion of the electrolyte layer exposed by the electrode layer may also be rounded in the same manner as the current collector 1500.

According to the above-mentioned present disclosure, by forming the anti-deformation support structures on the lower fluid-flow region of the frame, not only a uniform flow of fuel or air may be induced, but also deformation of the interconnector due to the height difference between the lower fluid-flow region and the upper reference region may be prevented. Further, the deformation of the frame itself, which may be otherwise caused by the difference between the thicknesses of the lower reference region and the cell supporting region, may be prevented.

Further, depending on the positions of the multi-functional structures, the loads applied to the different regions in the fuel cell in the fuel cell stack structure may be varied. According to the present disclosure, by forming the guide protrusions for supporting the multi-functional structure on the frame as described above, and by placing the central structure of the multi-functional structure relatively close to the fuel cell and placing the corner structures relatively far from the fuel cell, it is possible to reduce the deviation between the loads applied to the regions of the fuel cell while stably supporting the multi-functional structures.

While the foregoing description of the present disclosure has been provided with reference to preferred embodiments of the present disclosure, those skilled in the art will appreciate that various modifications and changes may be made to the present disclosure without departing from the spirit and scope of the present disclosure set forth in the claims that follow.

What is claimed is:

1. A frame for a fuel cell, the frame comprising:
a frame body having a channel opening defined therein and a feed opening and a discharge opening defined therein, wherein the feed opening and discharge opening are spaced apart from each other and the channel opening is disposed between the feed opening and discharge opening; and
a plurality of anti-deformation support structures protruding from a first region and a second region of a top face of the frame body, the first region being disposed between the channel opening and the feed opening and the second region being disposed between the channel opening and the discharge opening, wherein each of the plurality of anti-deformation support structures has an elliptical cross-sectional shape having a major axis and a minor axis,
wherein the top face of the frame body comprises an upper reference region and a lower fluid-flow region including the first region and the second region, wherein the lower fluid-flow region has a lower level than the upper reference region,
wherein the bottom face of the frame body comprises a lower reference region and an upper cell-supporting region, wherein the upper cell-supporting regions is formed along an edge of the channel opening and has a higher level than the lower reference region, and
wherein the major axis of each of the anti-deformation support structures extends from a first position of the lower fluid-flow region corresponding to the lower reference region to a second position of the lower fluid-flow region corresponding to the upper cell-supporting region.

2. The frame of claim 1, wherein each major axis of the anti-deformation support structures is parallel to a first direction from the feed opening to the discharge opening,
the anti-deformation support structures formed on the first region are arranged in a line along a second direction perpendicular to the first direction, and
the anti-deformation support structures formed on the second region are arranged in a line along the second direction.

3. The frame of claim 1, wherein a vertical height of each of the anti-deformation support structures is in a range of about 80% and about 120% of a height difference between the upper reference region and the lower fluid-flow region.

4. The frame of claim 1, further comprising:
guide protrusions protruding from the lower fluid-flow region and arranged regularly in a lattice form.

5. The frame of claim 4, wherein the feed opening comprises first and second feed holes spaced apart from each other,
wherein the first region comprises:
a third region positioned between the first feed hole and the channel opening,
a fourth region positioned between the second feed hole and the channel opening, and
a fifth region positioned between the third region and the fourth region and corresponding to a region between the first feed hole and the second feed hole,
wherein the anti-deformation support structures formed on the first region are formed on the third region and on the fourth region, wherein a least some of the guide protrusions are formed on the fifth region.

6. The frame of claim 5, wherein at least one of the anti-deformation support structures formed on the third region has a major axis inclined toward the fifth region, wherein said at least one is disposed adjacent to the fifth region, wherein each of remaining anti-deformation support structures of the anti-deformation support structures formed on the third region has a major axis parallel to a first direction from the feed opening to the discharge opening,
wherein at least one of the anti-deformation support structures formed on the fourth region has a major axis inclined toward the fifth region, wherein said at least one is disposed adjacent to the fifth region, wherein each of remaining anti-deformation support structures of the anti-deformation support structures formed on the fourth region has a major axis parallel to the first direction.

7. A fuel cell stack structure comprising:
a fuel cell including an upper electrode layer, a lower electrode layer and an electrolyte layer disposed between the upper electrode layer and lower electrode layer;
a frame disposed on a top face of the fuel cell; and
an interconnector disposed on the frame,
wherein the frame comprises:
a frame body having a channel opening defined therein and a feed opening and a discharge opening defined therein, wherein the feed opening and discharge opening are spaced apart from each other and the channel opening is disposed between the feed opening and discharge opening; and
a plurality of anti-deformation support structures protruding from a first region and a second region of a top face of the frame body toward the interconnector, the first region being disposed between the channel opening and the feed opening and the second region being disposed between the channel opening and the discharge opening, wherein each of the plurality of anti-deformation support structures has an elliptical cross-sectional shape having a major axis and a minor axis, wherein the top face of the frame body comprises an upper reference region and a lower fluid-flow region including the first region and the second region, wherein the lower fluid-flow region has a lower level than the upper reference region, wherein the bottom face of the frame body comprises a lower reference region and an upper cell-supporting region, wherein the upper cell-supporting regions is formed along an edge of the channel opening and has a higher level than the lower reference region, and wherein the major axis of each of the anti-deformation support structures extends from a first position of the lower fluid-flow region corresponding to the lower reference region to a second position of the lower fluid-flow region corresponding to the upper cell-supporting region.

8. The fuel cell stack structure of claim 7, further comprising a multi-functional structure disposed between the frame body and a portion of the interconnector corresponding to the frame body, wherein the multi-functional structure is disposed between the lower fluid-flow region and a portion of the interconnector corresponding to the lower fluid-flow region, wherein the frame further comprises a plurality of guide protrusions protruding from the lower fluid-flow region toward the interconnector to support a side face of the multi-functional structure.

9. The fuel cell stack structure of claim 8, wherein a vertical height of each of the guide protrusions is smaller than or equal to a vertical height of each of the anti-deformation support structures, wherein a vertical height of the multi-functional structure is substantially equal to the vertical height of each of the anti-deformation support structures.

10. The fuel cell stack structure of claim 7, further comprising a current collector inserted into the channel opening, wherein the current collector electrically connects the interconnector to the upper electrode layer of the fuel cell, and the current collector has a rectangular plate structure with rounded corners, wherein a lateral edge of each of the corners of the current collector is rounded.

* * * * *